Feb. 21, 1956 E. F. HUDDLE 2,735,254
DOUBLE SICKLE CUTTING ASSEMBLY
Filed Feb. 26, 1952 2 Sheets-Sheet 1
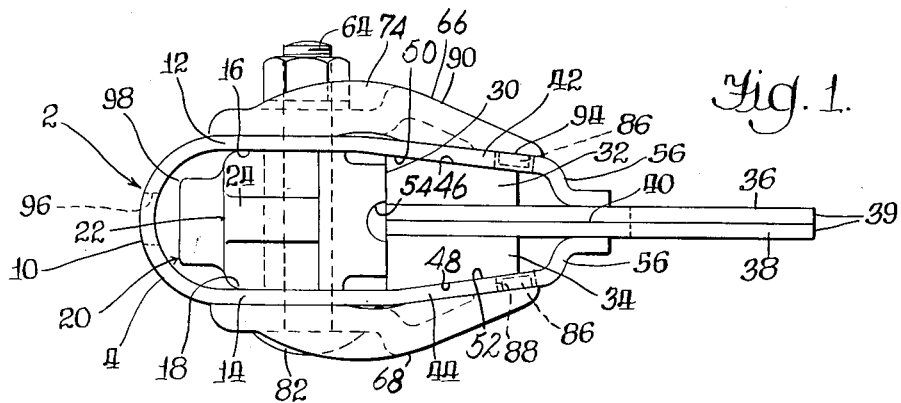
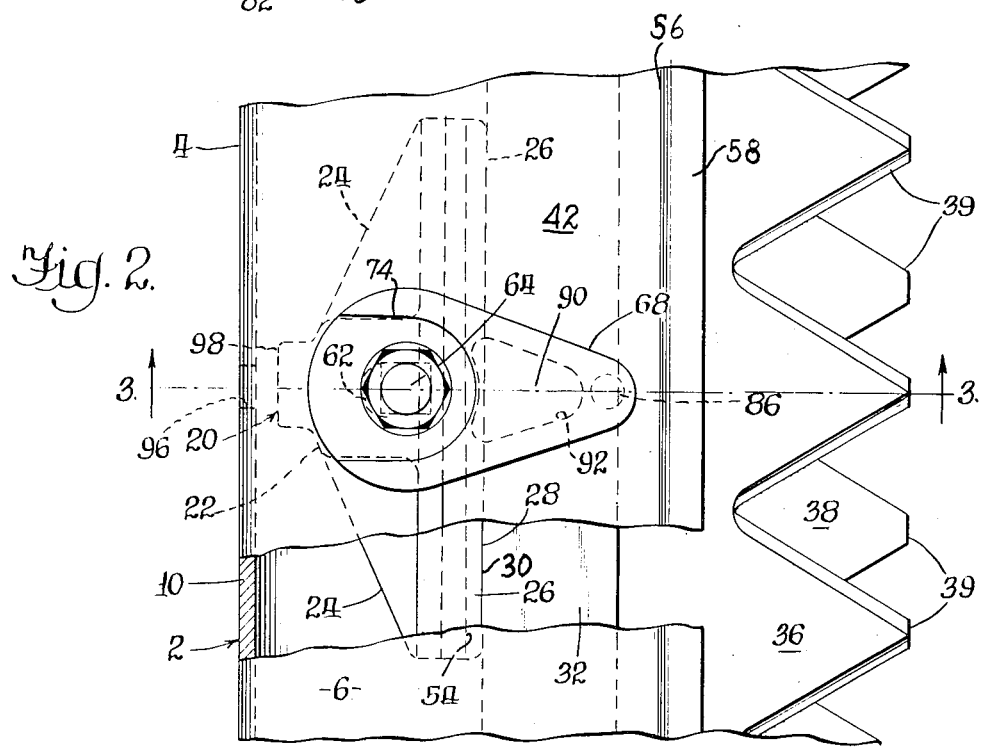
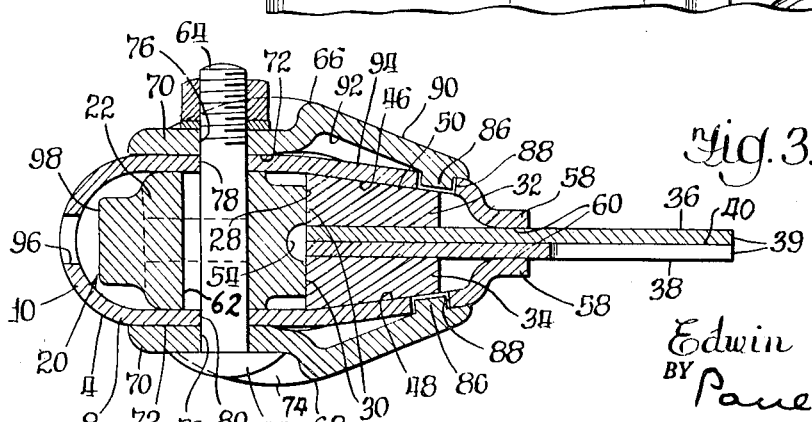
INVENTOR.
Edwin F. Huddle
BY Paul O. Pippel
Atty.

Feb. 21, 1956 — E. F. HUDDLE — 2,735,254
DOUBLE SICKLE CUTTING ASSEMBLY
Filed Feb. 26, 1952 — 2 Sheets-Sheet 2
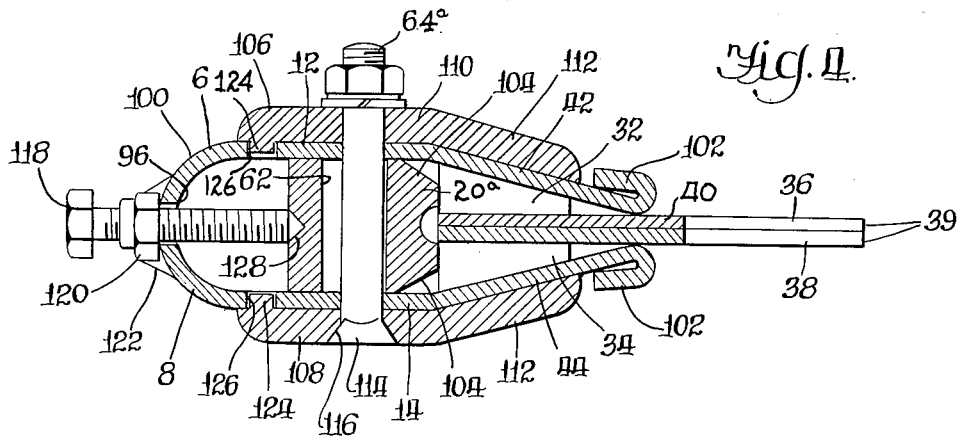

United States Patent Office 2,735,254
Patented Feb. 21, 1956

2,735,254
DOUBLE SICKLE CUTTING ASSEMBLY

Edwin F. Huddle, Elmwood Park, Ill., assignor to International Harvester Company, a corporation of New Jersey Application February 26, 1952, Serial No. 273,413

17 Claims. (Cl. 56—297)

This invention relates to mowers and more specifically to a novel cutter-bar assembly therefor.

A general object of the invention is to devise cutting means incorporating a pair of cooperating knives arranged in shearing relationship wherein the knives are adapted to be adjusted to obtain an efficient shearing action therebetween.

A more specific object is to provide a support for the knives in guided engagement therewith along cooperating wedge surfaces converging toward the knives and functioning in combination with an adjuster to maintain the knives in shearing relationship.

The invention contemplates a novel cutter-bar wherein the support is in the form of a sheath embracing the knives therebetween, the sheath providing opposed wedge surfaces converging toward the forward edge of the cutter, the wedge surfaces cooperating with complementary opposed wedge surfaces on the superposed knives entered between the wedge surfaces of the sheath.

The invention contemplates a novel wedging relationship between the knives and the sheath such as will have minimum wear and maximum life in service.

In carrying out the previous object the cutter is provided with a sheath having spaced top and bottom webs presenting opposed forwardly converging wedge surfaces receiving wedge blocks on the rear edges of a pair of superposed knives therebetween and in complementary engagement therewith, the back edges of the knives and blocks being engaged by adjusting blocks movably secured to the sheath and effective upon moving forwardly to wedge the knives between the wedge surfaces whereby the knives are urged toward each other and thus maintained in shearing relationship.

The invention further comprehends the provision of novel clamping means for rigidifying the sheath and operable to lock the adjusting means in adjusted position.

These and other objects of the invention will become more apparent from the specification and drawings wherein:

Fig. 1 is an end view of one form of cutter incorporating the invention;

Fig. 2 is a fragmentary top plan view thereof with parts broken away and shown in section;

Fig. 3 is a sectional view taken substantially on the line 3—3 of Fig. 2;

Figs. 4, 5 and 6 are each sectional views comparable to Fig. 3 and illustrating further modifications of the invention.

Describing the invention in detail and referring first to Figs. 1 to 3, the mower cutter assembly generally designated 2 may be of the type shown in my copending application entitled "Mower" Serial No. 260,496 filed December 7, 1951, and now Patent No. 2,664,690, and may comprise a support in the form of a sheath, generally indicated 4, of U-section and comprising spaced top and bottom webs 6 and 8 interconnected along their rear extremities at the base of the U by an arcuate rear web 10. The top and bottom webs 6 and 8 may comprise intermediate their front and rear margins substantially flat sections or portions 12 and 14 presenting substantially flat opposing generally parallel internal surfaces 16 and 18, respectively, receiving a backing or adjusting means, or bearing adjusting block element 20 at spaced intervals along the length of the sheath and in engagement with the top and bottom flat sides thereof.

Each adjusting block or bearing or wedge actuating means 20 may be a generally triangular member in plan view including a generally rectangular center section or body 22 with integral outstanding flanking gussets 24, 24 projecting from opposite sides thereof generally parallel to the portions 12 and 14 and on their forward edges merging into the back side of a generally vertical bearing wall 26 extending at opposite sides of the center body 22 and across the front thereof and providing a generally vertical flat bearing face 28 on its forward side in engagement or buttressed as at 30 with complementary back sides or rear edges or inner extremities of a pair of wedge elements 32 and 34 connected as by spot welding to the top and bottom sides, respectively, of a pair of superposed knives, blades or cutting elements 36 and 38 along the rear or back or inner edge portions thereof. The knives or cutting means carried by the support 4 engage each other along their adjacent flat faces as at 40 and each comprise a series of teeth or cutting means 39 at their outer forward extremities or portions sharpened along their lateral edges for shearing action upon longitudinal reciprocation of the knives.

The top and bottom webs, at their forward portions 42 and 44, are angled toward each other and converge forwardly or outwardly of the sheath and on their interior sides provide opposing wedge surfaces 46 and 48 forming wedge means on the support 4 in complementary engagement with forwardly converging opposing wedge surfaces or wedge means 50 and 52 on the top and bottom sides, respectively, of the wedge elements 32 and 34. It will be noted that the bearing wall 26 is recessed longitudinally thereof as at 54 in alinement with the rear margins of the knife blades 36 and 38 whereby to insure flat bearing at 30, 30 with the rear edges which are preferably in flat face engagement with the wedge blocks or shoes 32 and 34, forming the rear edges of the knife blades, along a plane extending generally vertically and substantially normal to the planes of the blades and approximately parallel to the longitudinal center lines thereof. This planar engagement insures vertical alinement of the blocks 32 and 34 and centering thereof within the sheath as well as proper mating of the knives such that one is not displaced forwardly of the other.

The forward extremities of the converging portions 42 and 44 of the top and bottom webs of the sheath are bent sharply toward each other as at 56, 56 and then projected forwardly to provide opposing lips 58, 58 in engagement as at 60, 60 with the adjacent of the remote sides of the blades 36 and 38.

The body 22 of the adjusting block is provided with a vertical hole or aperture 62 of oval shape which is disposed with its major axis extending transversely of the cutter. A securing or locking means in the form of a bolt 64 has its shank extending through the opening 62 and dimensioned to accommodate movement of the bearing block forwardly or rearwardly within the sheath or support.

It will be observed that by moving the bearing block forwardly the knives 36 and 38 are urged toward each other through the action of the wedging means which in the present form comprises the opposed surfaces 46 and 48 and the cooperating surfaces 50 and 52. It will be further noted that in cutting a crop with the mower, the tendency is for the knife blades to be pushed into the sheath due to the engagement of the knives with the crop. Thus, the knives bear very lightly against the wedging surfaces and heavily against the forward side of the bearing wall 28. Thus, wear is concentrated on areas which may be hardened and on relatively small parts which are readily replaceable.

A pair of opposing substantially identical clamping members or elements 66 and 68 are disposed at each bearing block, these elements being located respectviely on top and against the bottom of the sheath.

Each clamp 66 and 68 includes a rear portion 70 providing a flat surface on its internal side 72 bearing against the external side of the related portion 12 or 14. The external side of the rear portion 70 of each clamp member is provided with an outstanding generally U-shaped shield 74, the shield having its bight facing toward the forward side of the cutter and its legs projecting rearwardly and surrounding an opening 76 in the portion 70 for accommodating the shank of the associated bolt 64 which also extends through openings 78 and 80 in the rear portions 12 and 14 of the top and bottom webs of the sheath. The bolt head 82 of the bolt 64 is entered in the bottom shield and a nut is threaded on the upper end of the bolt shank and entered in the shield of the top clamp. These shields are intended not only to strengthen the clamps but also to prevent grasses from fouling or catching on the securing means. The clamp is rounded at its rear and tapered along its lateral edges toward the front and at its forward extremity is provided with a boss 86 projecting into a complementary opening 88 within the related section 42 or 44. The boss 86 and complementary opening 88 in conjunction with the bolt 64 prevents the clamps from rotating about the bolt. Each clamp includes a forward portion 90 which on its interior side may be cored away centrally as at 92 to reduce the area of engagement with the related portion 42 or 44, the forward portion 90 being provided with a bearing surface 94 about the cavity 92 in complementary engagement with the external side of the related forward portion 42 and 44 along a diagonal plane generally parallel to surface 46 or 48. The forward portions 90 thus provide a backing for the portions 42 and 44 of the sheath to prevent their flexing away or spreading apart due to the wedging action developed between the wedge blocks on the knives or blade elements and the portions 42 and 44.

The rear web 10 is provided at spaced intervals with openings 96 in alinement with the respective bearing blocks whereby a tool, such as a punch (not shown), may be entered through these openings 96 against bosses 98 on back sides of the respective blocks so that upon loosening the related bolts 64 the blocks may be tapped forwardly to adjust the wedging action of the related portion of the knives whereupon the bolts may be tightened to maintain such new adjusted position. It will be seen that the coupling means, formed by the portions 42 and 44 and the wedges 32 and 34 are limited in movement toward each other by the block 20 limiting tightening of the bolt.

Referring now to Figures 4 through 6 it will be noted that the construction is similar to that shown in Figures 1 through 3 and that the identical parts are identified by corresponding reference numerals.

In Figure 4 the sheath 100 is substantially identical with the sheath 4 with the exception that the forward edges of the top and bottom webs 6 and 8, and more specifically the portions 42 and 44 thereof, are outwardly return bent to provide lip portions 102, 102. The block or wedge actuating means 20a has been simplified and at its forward upper and lower corners is chamfered as at 104, 104 (the block 20 in Figures 1–3 being cut out in these corners) to accommodate its movement between the rear extremities of the portions 42 and 44 to bias the wedge portions 32 and 34 of the knives or cutters 36 and 38 into wedging relationship with the portions 42 and 44.

The top and bottom clamp members 106 and 108 are of substantially identical construction and each comprise substantially flat angularly related flat portions or sections 110 and 112 paralleling respectively the related portions 12 and 42 or 14 and 44 and in flat-faced complementary engagement therewith.

The bolt identified 64a has been slightly modified over bolt 64 in that its head 114 is countersunk within a complementary recess 116 within the bottom clamp member 108.

Adjustment of the block 20 is effected by means of a movable adjusting element or member or positionable adjuster 118 in the form of a bolt which is threaded through a nut 120 mounted as at 122 by welding about the opening 96 in the sheath 100.

Each clamp member 106 and 108 is provided along its rear margin on its internal side with an inwardly extending boss 124 entered within a complementary opening or hole 126 in the related portion 12 or 14.

The bolt 118 has a pointed forward end extending within a complementary depression or recess 128 in the back side of the bearing block 20.

Adjustment of the cutter is effected by loosening the nut on the bolt 64a and then rotating the bolt 118 to desired position. The bearing block 20 is then locked in adjusted position by tightening the nut of the bolt 64a.

Referring now to Figure 5 wherein parts identical with those in Figures 1–4 are identified with corresponding reference numerals, the sheath 150 is substantially similar to the sheaths 4 and 100 and differs therefrom merely by having the forward edges of the portions 42 and 44 thereof provided on their forward edges with inturned reverse-bent lip portions or flanges 152, 152 which bear as at 154, 154 against the remote sides of the knife blades 36 and 38. The bearing block or wedge actuating means 20b is substantially identical with that shown in Figure 4 with the exception that it is provided on its upper rear corner with a wedge surface 156 which slopes downwardly rearwardly in a plane extending transversely to the plane of the knife blades. The surface 156 is engaged by a complementary conical wedge surface 158 on a positioner or positioning element or positionable adjuster in the form of a bolt or bias means 160 which extends through a substantially vertical opening 170 in the portion or web 6 of the sheath, the bolt 160 having a shank 162 threaded as at 164 in the rear portion of the top clamp member 106a which is substantially identical with the bottom clamp member 108b except for the threaded hole at 164. It will be seen that by inturning the lip portions 152, 152, the top and bottom clamp members are provided with more space toward the forward extremities of the sheath and the forward ends 166, 166 of these clamp members 106a and 108b, which are similar to members 106 and 108, overlie and underlie respectively the respective lips 152, 152, thus rigidifying the forward portions of the sheath.

In order to adjust this cutter, the bolt 64a is loosened and then the bolt 160 is threaded into the sheath whereupon, due to the wedging action between the surfaces 156 and 158, the block 20b is caused to move forwardly whereby wedging the portions 32 and 34 of the knives with the portions 42 and 44 which converge forwardly whereby the knives 36 and 38 are urged toward each other into shearing relationship. After the adjustment is completed the nut on the bolt 64a is again tightened so as to lock the block 20b in adjusted position and the clamp members 106a and 108b against the sheath.

Referring now to Figure 6 wherein parts identical with those in the previous embodiments are identified with corresponding reference numerals, the sheath identified as 4a is identical with the sheath 4 shown in Figures 1 through 3 with the exception that the top web 6 at the portion 12 thereof is provided with a substantially vertical opening 200 through which extends a bolt shank 202 which at its lower end within the sheath 4a is threaded into a wedge 204, the wedge 204 at its forward side engaging the back side of the bearing block, or wedge actuating means, identified as 20d along complementary flat surfaces 206 which slope downwardly forwardly and extend transversely to the planes of the knife blades 36 and 38. The upper end of the shank 202 is unthreaded and extends through an opening 208 in the upper clamp member 106b and the upper end of the shank is provided with a head 210 which on its underside may bear upon a lockwasher 212 engaged with the top side of the rear portion of the clamp member 106b. It will be seen that the lower clamp member 108b is substantially similar to the clamp member 106b with the exception of the elimination of the opening 208 therethrough. It will be seen that the block and the clamp members are maintained in adjusted and clamping relationship by means of a nut and bolt or telescoping bolt assembly 64c which extends through the oval-shaped opening 62 in the bearing block 20d.

To adjust the assembly shown in Figure 4 the bolt assembly 64c is loosened and the bias means or screw bolt 202, 210 is rotated to thread the shank 202 within the bearing or wedge member 204, which with bolt 202, 210 provides a positionable adjuster, whereby the wedge member is caused to move upwardly and due to the wedging engagement of the faces at 206 the block 20d is caused to move forwardly whereby wedging the portions 32 and 34 of the knife blades 36 and 38 against the faces on the portions 42 and 44 of the sheath and bringing the blades 36 and 38 toward each other in shearing relationship.

What is claimed is:

1. In a cutter for a mower, a U-section sheath, a pair of superposed knife blades within the sheath projecting through the forward open edge thereof, bearing means adjustably mounted within the sheath and buttressed against the back edges of said knives, and cooperating wedge means on the sheath and knives having substantially flat faces in slidable engagements and wedging said knives together in shearing relationship, said wedge means on the knives movable therewith by said bearing means to effect a wedging action with said wedge means on the sheath along said faces.

2. In a cutter for a mower, a support, cutting means carried thereby, a cutting element disposed in shearing relationship with said cutting means, wedge means on the support, wedge means on the cutting element wedged between the same and said wedge means on the support for urging the cutting element toward and into close coupled shearing relationship with said cutting means, and means between the support and said wedge means on said cutting element for moving the latter into said wedging relationship.

3. In a cutter for a mower, a support including a pair of top and bottom webs spaced apart to form a slot and presenting opposed wedge surfaces converging towards the slot, a pair of superposed knife elements extending through the slot and movably mounted between said webs for movement into and out of the support through the slot, said elements having rear edges disposed between said surfaces and in complementary wedging engagement therewith, and adjustable bearing means engaging the backs of said knife elements and movable in a direction wedging said knife elements between said surfaces.

4. In a cutter for a mower, a support structure presenting internal top and bottom opposed angularly related wedge faces and defining a slot therebetween, a pair of superposed knife elements entered between said faces in said slot and each presenting a wedge surface in complementary engagement with the opposed face, and means cooperatively associated with the support and said elements for adjusting the relative positions of said faces and surfaces for wedging said knife elements against each other in shearing relationship.

5. In a cutting apparatus, a sheath comprising spaced top and bottom webs presenting leading edges defining a slot therebetween and opposed forwardly converging wedge faces converging towards said edges, a pair of superposed top and bottom cutting elements having rear portions positioned between said faces and forward portion projecting through said slot, wedge means on the remote sides of said cutting elements disposed in wedging relationship with respective faces, and bearing means movably mounted on said sheath and buttressed against the rear edges of said knife elements along a substantially flat vertical surface, said elements being movable through said slot by said bearing means in a direction out of the sheath to engage said wedge means with said faces.

6. In a cutter assembly, a pair of superposed knife elements arranged in shearing relationship, means for maintaining said knife elements in said shearing relationship and comprising spaced means receiving portions of said knife elements therebetween, wedge means between said portions and said spaced means cooperatively associated therewith for holding said knife elements in close coupled shearing relationship and wedge actuating means cooperatively associated with said wedge means for effecting a wedging action therebetween.

7. In a cutter assembly, a plurality of knife members arranged in shearing relationship said knife members each having a first cutting edge portion, coupling means embracing said members and including opposed wedge means receiving other portions of said members therebetween, said wedge means including means presenting a wedge surface and position on the said other portion of each member and an opposed wedge surface on said coupling means, said surfaces converging toward the cutting edge portions of said members, and means operable between said coupling means and said wedge means for developing a wedging action of said wedge means through movement of said members and engaging the wedge surfaces thereon with said wedge surfaces on said coupling means.

8. In a cutter, top and bottom superposed knife elements disposed in shearing relationship, a U-shaped sheath having top and bottom webs receiving the rear edge portions of said elements therebetween, a rear web interconnecting said top and bottom webs along their rear margins and spaced rearwardly of said rear edge portions of said elements, wedge actuating means including a bearing block between said top and bottom webs intermediate the rear edge portions of said knife elements and said rear web and having a forward side in engagement with the rear edges of said rear edge portions of said knife elements, said top and bottom webs having forwardly converging portions presenting internal opposed forwardly converging wedge faces, wedge surfaces on said rear edge portions of said knife elements in complementary engagement with respective wedge faces along forwardly converging planes, and means releasably clamping said bearing block in adjusted positions between said top and bottom webs.

9. In a cutter, a pair of superposed knife elements having outer cutting portions, coupling means embracing the inner portions of said elements for maintaining said elements in shearing realtionship, and including spaced sections presenting opposed angularly related outwardly converging wedge faces, a mating wedge surface on the inner portions of each element in wedging engagement with the adjacent wedge face, and means for relatively adjusting said sections and elements in a direction disposing said wedge surfaces and faces in wedging relationship and comprising a bearing member engaging said elements at the inner extremities of their inner portions, and means for adjusting said bearing member against said elements and including a positionable adjuster reacting between one of said sections and said bearing member and in wedge engagement with the latter.

10. A cutter according to claim 9 wherein said adjuster comprises a threaded member in threaded engagement with one of said sections, and said wedge engagement between said threaded member and said bearing member is oriented in a plane extending diagonally with respect to the direction of movement of said bearing member toward and away from said elements.

11. A cutter according to claim 9 wherein said adjuster comprises a wedge in wedging engagement with a side of the bearing member opposite the side engaging said elements, and bias means acting between at least one of said sections and said wedge for urging the latter into said wedging engagement with said bearing member.

12. In a cutter, a sheath including spaced top and bottom webs and an interconnecting rear web, said webs presenting substantially flat, internal opposed wedge faces converging in a direction away from the rear web, a pair of superposed knife elements having rear edges positioned between said faces and having forward edges provided with cutting means projecting forwardly outwardly of said sheath, wedge means connected to each element and disposed in opposing relationship to the adjacent wedge face and in wedging engagement therewith, bearing means between said top and bottom webs having a forward side engaging the rear edges of said elements, and means for moving said bearing means and enterable through an aperture in said rear web for engaging the back side of said bearing means.

13. A cutter according to claim 12 wherein said means for moving said bearing means comprises threaded means on said rear web at said aperture and a threaded member cooperating with said threaded means and engaging the back side of said bearing means for urging it.

14. For use with a pair of superposed blades of the type wherein said blades comprise portions presenting bearing surfaces on their remote sides, a cutter bar sheath comprising spaced opposed webs and an interconnecting rear web, said opposed webs presenting opposed internal substantially flat wedge faces converging in a direction away from said rear web and adapted to receive said portions of said blades therebetween for engagement of said surfaces with respective faces.

15. In a cutter, a support including spaced opposed top and bottom portions presenting internal wedge faces, a pair of flat cutter blades having back longitudinal edges positioned between said faces and each blade provided with a wedge surface on said back edge thereof opposing and in complementary engagement with the adjacent wedge face, and a movable element bearing against the back edges of said blades and engaging the same along a plane substantially normal to the planes of the blades and generally parallel to the longitudinal axes thereof and adapted upon movement thereof against said back edges of said blades to urge said wedge faces on the blades into engagement with the wedge faces upon said top and bottom portions and said knife blades into tight pressing engagement with each other.

16. In a cutter, a sheath having spaced top and bottom flexible webs, a pair of superposed shearing knife blades having their back edges extended between said webs and their forward cutting edges projected outwardly thereof, cooperating wedge portions on said webs and respective blades, the wedge portion of each blade comprising a substantially triangular shaped segment between the blade and the related web wedge portion, adjusting means between said webs bearing against said blades, clamping means embracing said webs and each having a complemental section at the wedge portion of the associated web disposed in backing relationship thereto, and common means drawing said clamping means against the sheath and said webs against said adjusting means to hold it in adjusted position, said adjusting means limiting flexing of said webs toward each other and restricting movement of said clamping means against the sheath.

17. In a mower, a support structure comprising a U-section sheath including a rear wall and spaced top and bottom webs projecting forwardly therefrom, said webs having rear portions adjacent said rear wall presenting generally parallel internal surfaces, a bearing member between said surfaces and movable toward and away from said rear wall, said webs having forward portions formed as continuations of the rear portions and presenting internal opposed wedge faces converging in a direction away from the rear wall, a pair of superposed knife elements disposed in superposed shearing relationship and each having a corresponding one portion positioned between said faces, each said one portion of each element having a substantially trapezoidal-shaped wedge secured thereto between the same and the adjacent face, each wedge presenting a wedge surface opposing the adjacent wedge face and in complementary slidable engagement therewith, the wedge of each element presenting a side adjacent said wedge surface thereof in engagement with one side of said bearing in a plane angularly related to said wedge surface, means cooperatively associated with the bearing and said top and bottom webs for releasably clamping said bearing therebetween, a wedge element between said bearing and said rear wall, and cooperative engaging wedge surfaces on said wedge element and said bearing on a side of the bearing opposite said one side thereof and sloping downwardly away from said rear wall, and actuating means acting between said wedge element and one of said webs for urging said wedge element into said wedging engagement with said bearing.

References Cited in the file of this patent

UNITED STATES PATENTS

| | | |
|---|---|---|
| 631,009 | Hahn | Aug. 15, 1899 |
| 769,133 | Grant | Aug. 30, 1904 |
| 834,969 | Clarkson | Nov. 6, 1906 |
| 1,353,450 | Brown | Sept. 21, 1921 |
| 1,594,244 | Daniels | July 27, 1926 |
| 2,601,754 | Brekke | July 1, 1952 |

FOREIGN PATENTS

| | | |
|---|---|---|
| 166,680 | Germany | Apr. 2, 1934 |